(12) United States Patent
Ferlitsch

(10) Patent No.: US 7,420,701 B2
(45) Date of Patent: Sep. 2, 2008

(54) SYSTEMS AND METHODS FOR PROVIDING AUTOMATIC LANGUAGE SWITCHING

(75) Inventor: Andrew Rodney Ferlitsch, Tigard, OR (US)

(73) Assignee: Sharp Laboratories of America, Inc., Camus, WA (US)

( * ) Notice: Subject to any disclaimer, the term of this patent is extended or adjusted under 35 U.S.C. 154(b) by 611 days.

(21) Appl. No.: 10/865,394

(22) Filed: Jun. 10, 2004

(65) Prior Publication Data

US 2005/0068574 A1    Mar. 31, 2005

Related U.S. Application Data

(63) Continuation-in-part of application No. 10/676,477, filed on Sep. 30, 2003.

(51) Int. Cl.
G06F 3/12    (2006.01)
G06F 17/00    (2006.01)

(52) U.S. Cl. ............... 358/1.15; 358/1.13; 382/229; 710/3; 710/5; 710/16; 715/234

(58) Field of Classification Search ........... 358/1.13, 358/1.15; 382/229; 710/3, 5, 16; 715/513, 715/234
See application file for complete search history.

(56) References Cited

U.S. PATENT DOCUMENTS 5,115,501 A * 5/1992 Kerr .................. 707/9
5,222,200 A 6/1993 Callister et al. ............. 395/112
5,467,432 A 11/1995 Ota ............................. 395/112
5,854,940 A * 12/1998 Niihara et al. ................. 710/5
5,960,113 A * 9/1999 Even et al. ................... 382/229

* cited by examiner

Primary Examiner—David K Moore
Assistant Examiner—Peter K Huntsinger
(74) Attorney, Agent, or Firm—Michael F. Krieger; Kirton & McConkie

(57) ABSTRACT

Systems and methods for accurately recognizing a language format of an input imaging data stream when no explicit language switch is present. A sniffer process is initiated when an imaging device receives an input imaging data stream. The sniffer process analyzes an initial sample of the input stream to determine the language format by enumerating through a set of language recognizers that are implemented as callback functions. The enumeration uses a dynamic heuristic approach to selecting the order in which to try the language recognizers. Each language recognizer has a sample size associated with it. For each language recognizer enumerated, the sniffer process pre-reads the associated sample size and invokes the associated callback function with the byte sample. The enumeration continues until a language recognizer acknowledges recognition of the language format or the set of language recognizers is exhausted.

23 Claims, 9 Drawing Sheets

SYSTEMS AND METHODS FOR PROVIDING AUTOMATIC LANGUAGE SWITCHING

RELATED APPLICATIONS

This application is a continuation-in-part to U.S. patent application Ser. No. 10/676,477 filed Sep. 30, 2003, entitled ENABLING A HETEROGENEOUS IMAGING DEVICE TO OPERATE AS A HOMOGENEOUS DEVICE, which is incorporated herein by reference.

BACKGROUND OF THE INVENTION

1. Field of the Invention

The present invention relates to image rendering. In particular, the present invention relates to systems and methods for accurately recognizing a language format of an input imaging data stream when no explicit language switch is present.

2. Background and Related Art

Imaging devices, and many raster only devices, are currently available that only support a single language format, such as raster data that is specific to the device's printing engine. For such devices, the imaging data is based without prior checking to the print data interpreter. If the input is of the correct language format, all input is recognized and the job is outputted. Otherwise, when some or all of the input is not recognized, the job is not output. FIG. 1 illustrates a single language supported printer technique.

A multi-language supporting imaging device technique includes requiring an explicit language switch that precedes the imaging data. In this technique, some command or data is first read in a known or predetermined format that specifies to the imaging device the language format of the subsequent imaging data. For example, there are imaging devices that support explicit language switching by supporting the printer job language (PJL) command @ PJL ENTER LANGUAGE=<language>. If the specified language is supported by the device, the imaging data is then based to the corresponding interpreter. Otherwise, the input is rejected and the job is not outputted. FIG. 2 illustrates a multiple language supported printer technique.

Using an explicit language switch is limiting in a varied input environment where disparate generators of imaging data may not conform to a single convention for constructing an imaging job but otherwise generate imaging data that is compatible with the device. For example, a manufacturer of an imaging device may provide device drivers for one environment that use an explicit switching convention, but the device may be used in another environment that may generate imaging data without the use of an explicit language switch.

One technique is disclosed in U.S. Pat. No. 5,960,113. In this technique, an initial byte sample of the input stream is pre-read and passed to a language recognition process. For each supported language, there is a language specific recognition test, such as looking for a special signature in the byte sample. The technique applies each language specific recognition test in a predetermined sequential order until one acknowledges recognition of the language format. When then language is recognized, the input stream is then based to the corresponding language interpreter.

This technique still has the limiting factor in that it may not necessarily be efficient in finding the language, since the order of applying the language recognizers is predetermined. For example, the majority of the inputs to a device in one environment may be language A, but the associated language recognizer may be the last to test for. Thus, in such an environment, resources are initially consumed for languages that won't be recognized. FIG. 3 illustrates this type of technique.

Another technique is disclosed in U.S. Pat. No. 5,467,432. In this technique, an initial byte sample of the input stream is pre-read. The initial byte sample is then compared against a group of language recognizers (e.g., one per supported language). Each language recognizer looks for mode-determinative codes that are suggestive but not necessarily certain of the being part of the language. For each mode determinative code, a probability of the likelihood of being an indicator of the language is assigned. The process completes by summing up the probabilities of all the determinative codes found in the sample on a per language basis. The process then selects the language, which had the highest probability summation.

This technique is still limited in that it only guesses the correct language and thus is prone to selecting the wrong language. Secondly, the performance of the technique is inefficient in that all the languages must be tested before a selection is made. FIG. 4 illustrates this type of technique.

Thus, while techniques currently exist that are used to provide language switching, challenges still exist. Accordingly, it would be an improvement in the art to augment or even replace current techniques with other techniques.

SUMMARY OF THE INVENTION

The present invention relates to image rendering. In particular, the present invention relates to systems and methods for accurately recognizing a language format of an input imaging data stream when no explicit language switch is present.

When a multi-language supporting imaging device receives imaging data without an explicit indication of the language format, the imaging device samples the imaging data and determines the language format. Implementation of the present invention takes place in association with an image rendering system, wherein an efficient method is employed for accurately recognizing the language format (e.g., PDL or other language) of an imaging data stream when there is no explicit language switch (e.g., automatic language switching).

In at least some implementations, a sniffer process is initiated when an imaging device receives an input imaging data stream (e.g., print job). The sniffer process analyzes an initial sample of the input stream to determine the language format (e.g., PDL or other language). The sniffer does this by enumerating through a set of language recognizers, implemented as callback functions. Each language recognizer has a sample size associated with it. For each language recognizer enumerated, the sniffer process pre-reads the associated sample size and invokes the associated callback function with the byte sample. The enumeration continues until a language recognizer acknowledges recognition of the language format or the set of language recognizers is exhausted.

The enumeration uses a dynamic heuristic approach to selecting the order in which to try the language recognizers. The heuristic approach involves keeping a count of the number of times the language was recognized. When a language is recognized, the count for the associated language recognizer is incremented. Initially (e.g., first power-up), the language recognizers are enumerated in a random order. After at least one successful language recognition, the language recognizers are then enumerated in a preference order according to the number of times the language was recognized (e.g., moves higher up the list as the language is more often recognized).

When two or more language recognizers have the same count, the preference order within the same count group is still random.

Accordingly, a device becomes more efficient for the specific environment in which the device is operating since there is a reduction in the average number of language recognizers applied until the language is recognized.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to image rendering. In particular, the present invention relates to systems and methods for accurately recognizing a language format of an input imaging data stream when no explicit language switch is present.

When a multi-language supporting imaging device receives imaging data without an explicit indication of the language format, the imaging device samples the imaging data and determines the language format. This process is commonly referred to as automatic language switching. Embodiments of the present invention take place in association with an image rendering system, wherein an efficient method is employed for accurately recognizing the language format (e.g., PDL or other language) of an imaging data stream when there is no explicit language switch (e.g., automatic language switching).

The following disclosure of the present invention is grouped into two subheadings, namely "Exemplary Operating Environment" and "Providing Language Format Recognition." The utilization of the subheadings is for convenience of the reader only and is not to be construed as limiting in any sense.

Exemplary Operating Environment

Figure 1:
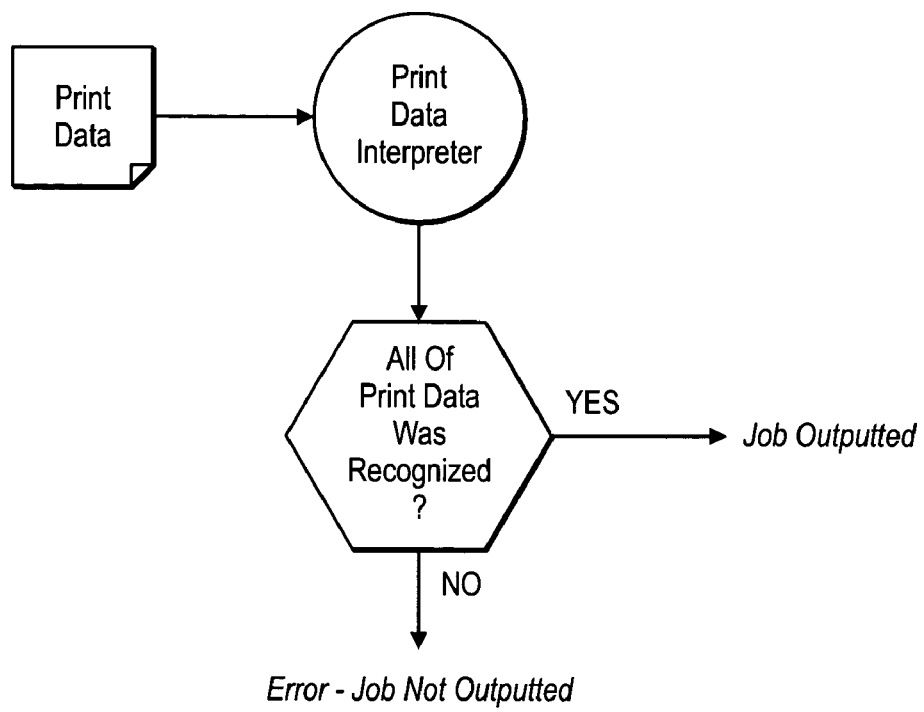
FIG. 1 is a prior art single language supported printer technique.
Figure 2:
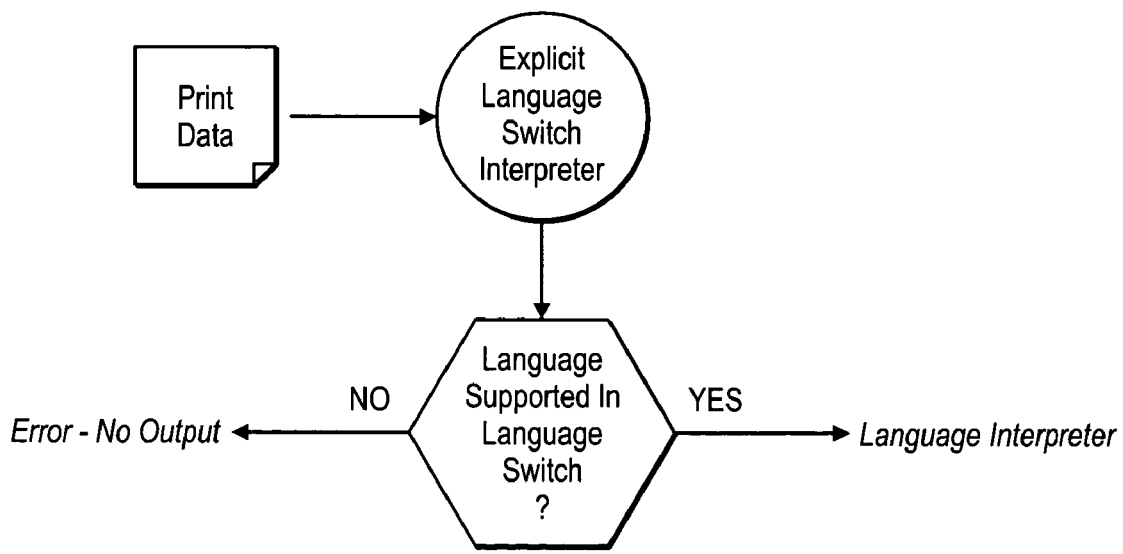
FIG. 2 is a prior art multiple language supported printer technique.
Figure 3:
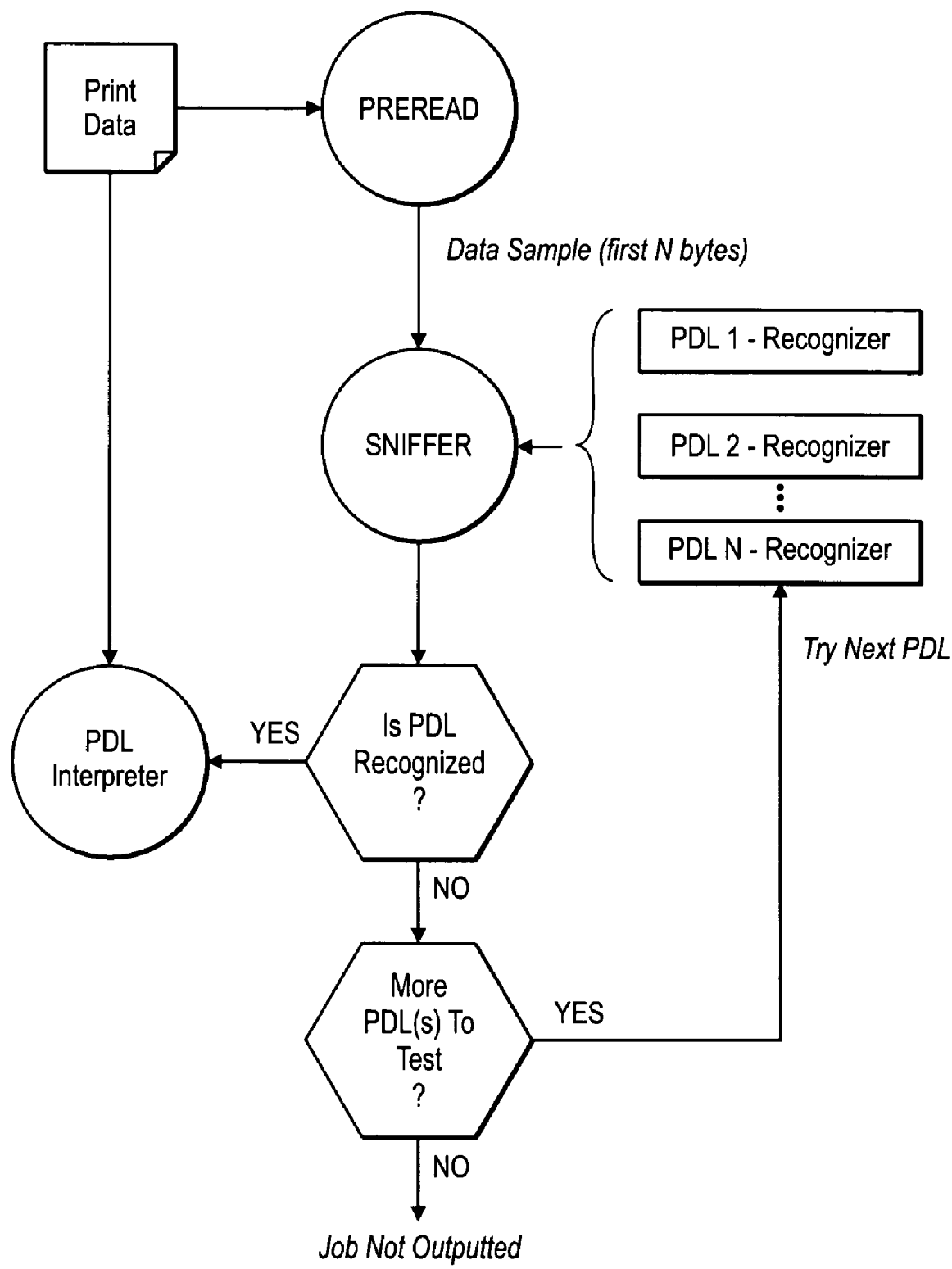
FIG. 3 is a prior art automatic language switching technique.
Figure 4:
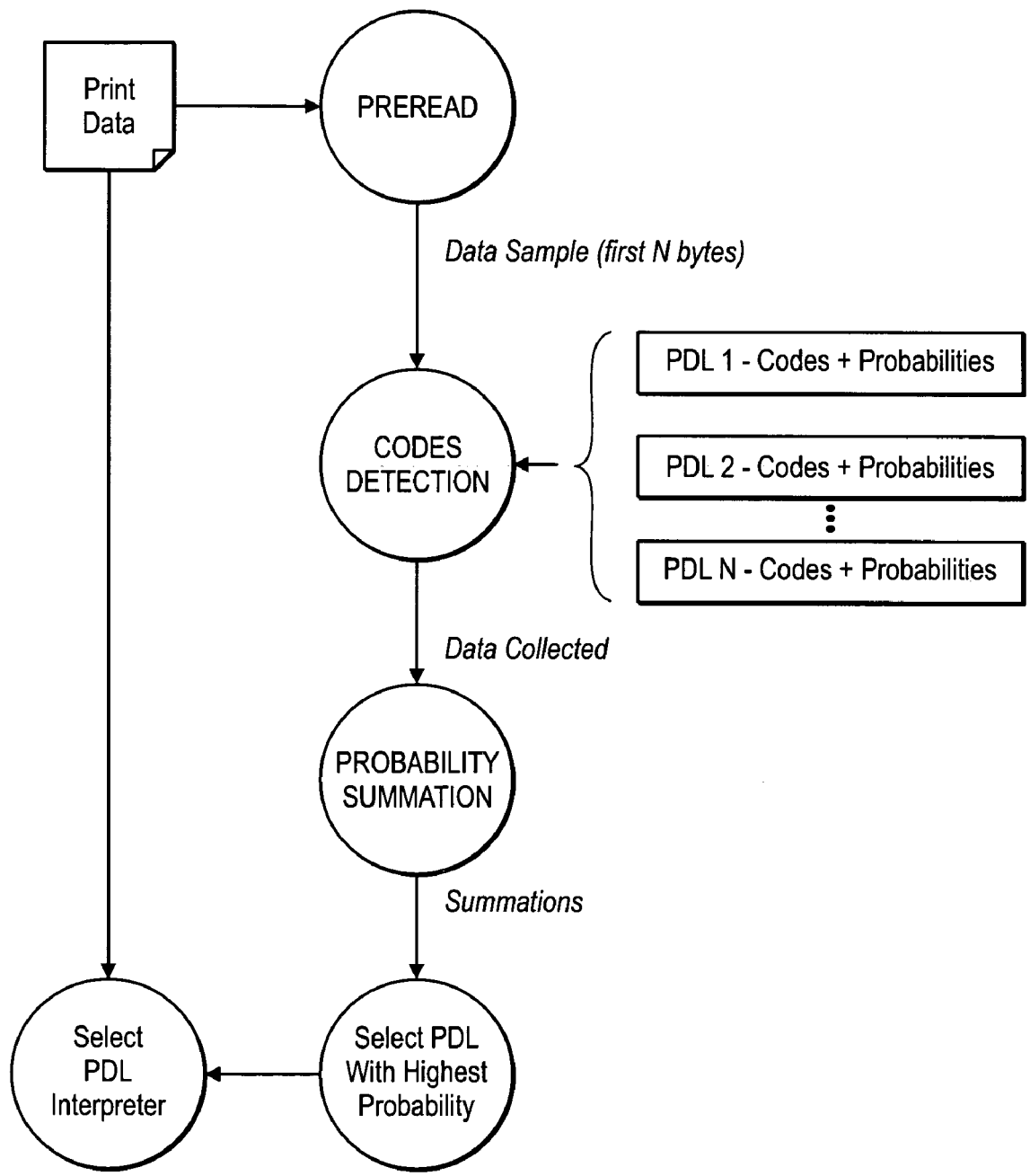
FIG. 4 is another prior art automatic language switching technique.
Figure 5:
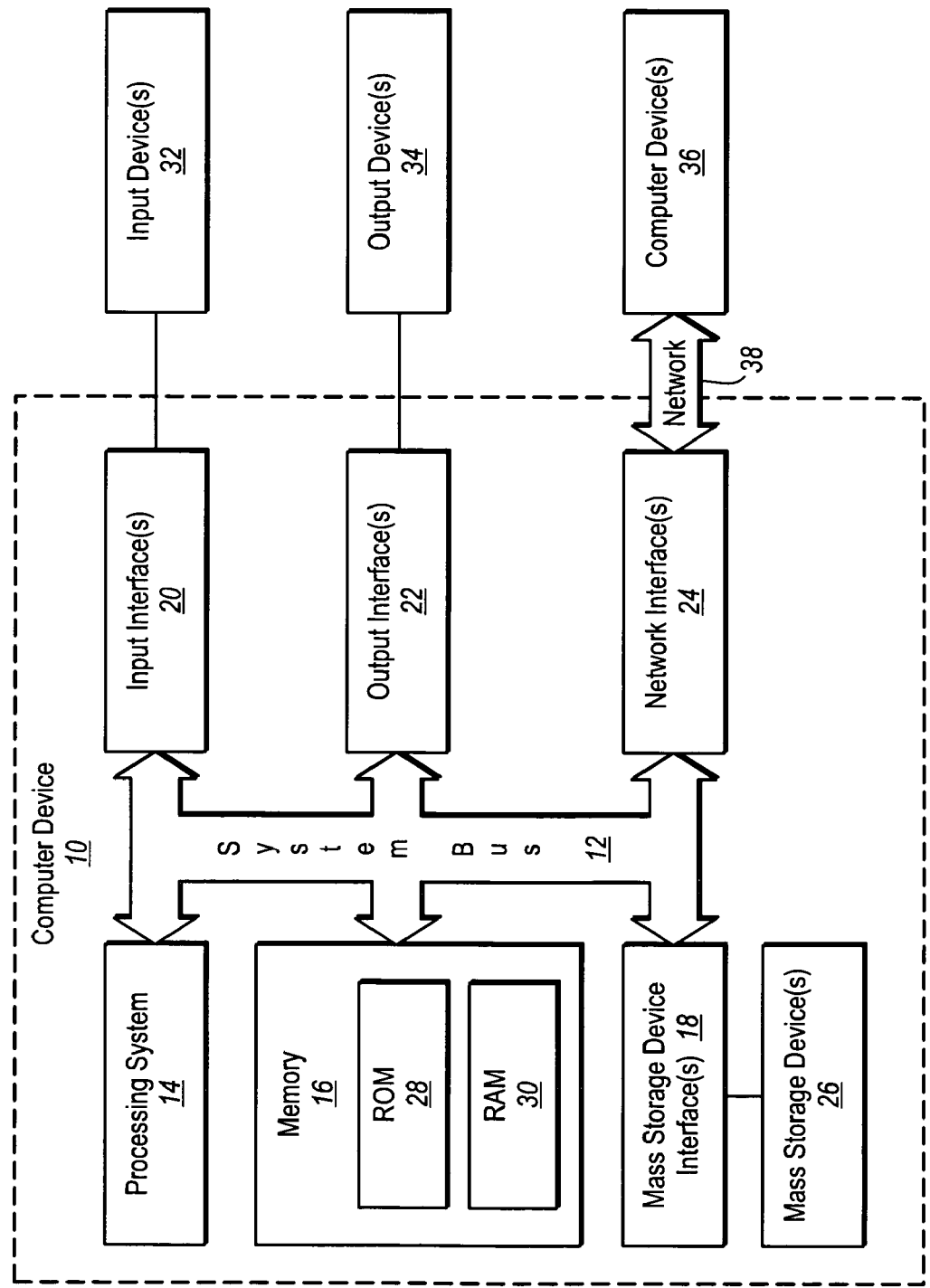
FIG. 5 illustrates a representative system that provides a suitable operating environment for use in association with the present invention.

FIG. 5 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 5, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 6:
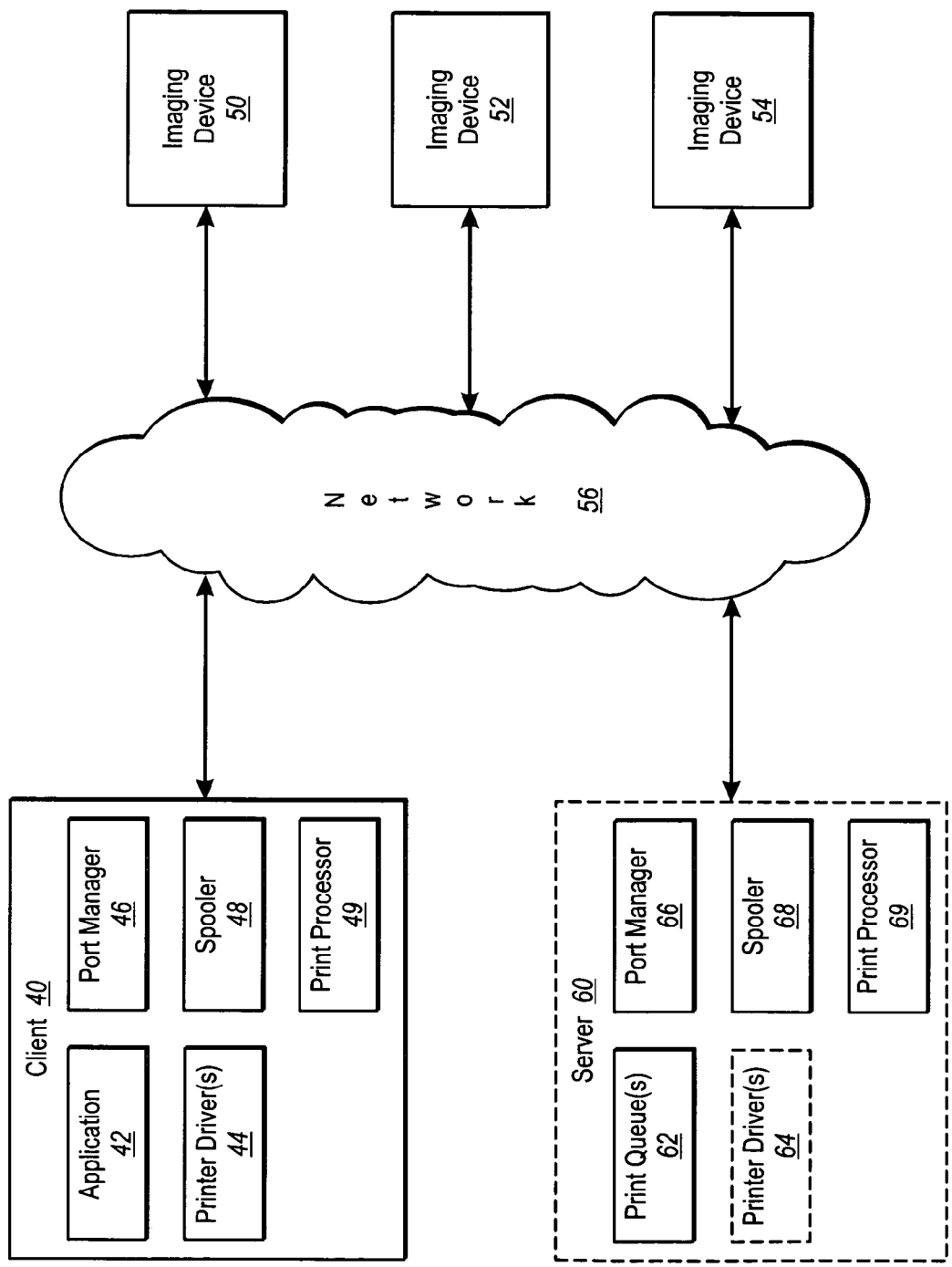
FIG. 6 illustrates a representative networked system configuration in association with an embodiment of the present invention.

Thus, while those skilled in the art will appreciate that embodiments of the present invention may be practiced in a variety of different environments with many types of system configurations, FIG. 6 provides a representative networked configuration that may be used in association with the present invention. While FIG. 6 illustrates an embodiment that includes a client, three imaging devices, and optionally a print server connected to a network, alternative embodiments include more than one client, less than three imaging devices, more than three imaging devices, no server, and/or more than one server connected to a network. Moreover, other embodiments of the present invention include local, networked, or peer-peer imaging environments, where one or more computer devices are connected to a plurality of imaging devices for rendering imaging jobs. Some embodiments include wireless networked environments, or where the network is a wide area network, such as the Internet.

The representative system of FIG. 6 includes a computer device, illustrated as client 40, which is connected to a plurality of imaging devices 50-54 across network 56. In FIG. 6, imaging devices 50-54 may be any type of imaging device that may be used to render a imaging job. Examples include a printer, a multi-functional peripheral ("MFP"), a scanner, a facsimile device, an electronic whiteboard, a display monitor, a tablet PC, a document server, etc. While imaging devices 50-54 are connected to network 56, embodiments of the present invention embrace the use of imaging devices that are locally connected to a computer device, that are configured in a peer-to-peer imaging environment, or that are configured in a wireless network environment.

In the illustrated embodiment, client 40 includes a software application 42, one or more print drivers 44, a port manager 46, a spooler 48, and a print processor 49. A server 60 is optionally included having, for example, one or more print queues 62, one or more printer drivers 64, a port manager 66, a spooler 68, and a print processor 69.

Thus, in accordance with the illustrated embodiment and other embodiments of the present invention, a language format of an input imaging data stream is recognized when no explicit language switch is present.

Providing Language Format Recognition

When a multi-language supporting imaging device receives imaging data without an explicit indication of the language format, the imaging device samples the imaging data and determines the language format. Embodiments of the present invention take place in association with an image rendering system, wherein an efficient method is employed for accurately recognizing the language format (e.g., PDL or other language) of an imaging data stream when there is no explicit language switch (e.g., automatic language switching).

Figure 7:
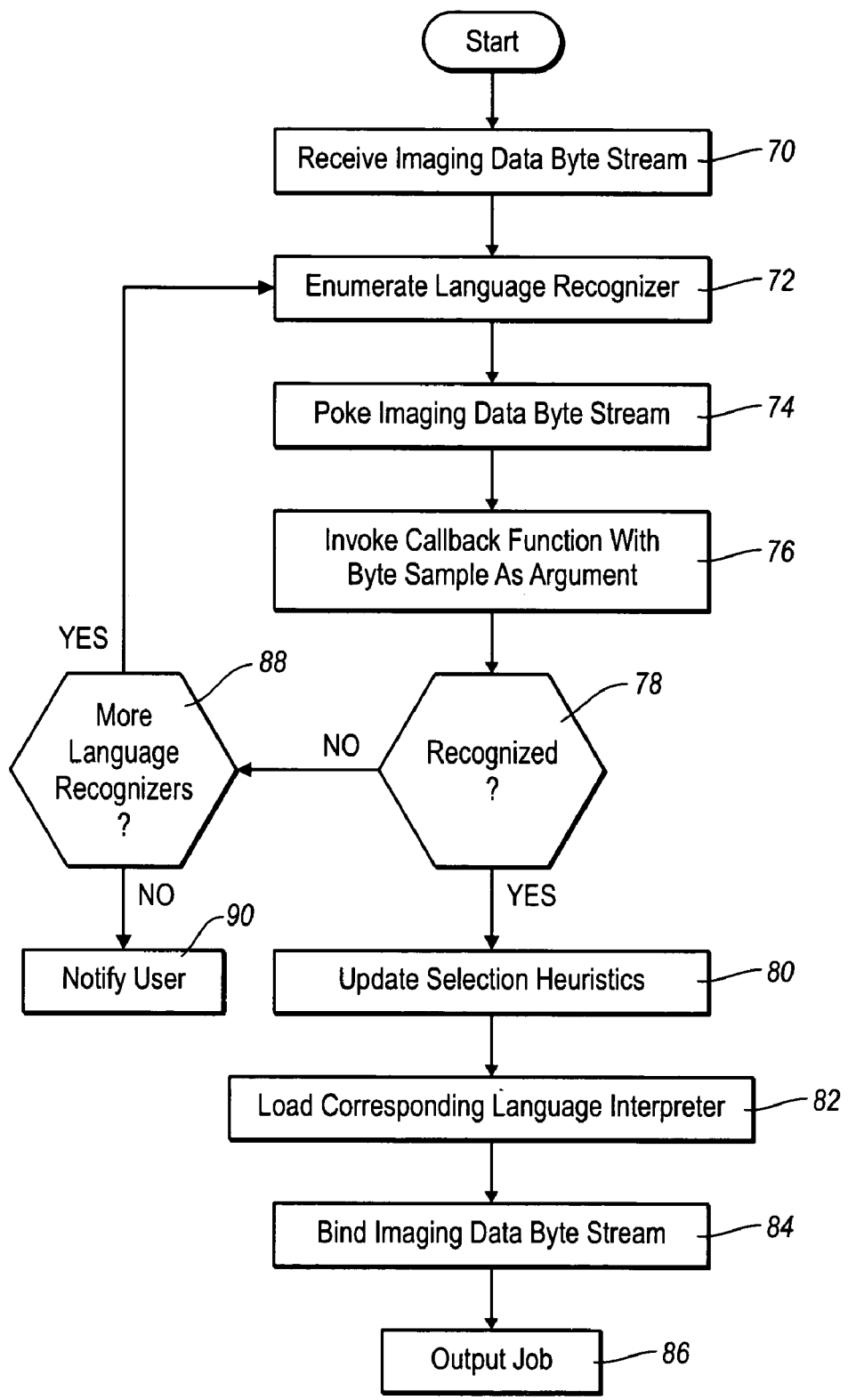
FIG. 7 is a flow chart that illustrates a representative embodiment in accordance with the present invention.

With reference now to FIG. 7, a flow chart is provided that illustrates a representative embodiment in accordance with the present invention. In FIG. 7, a sniffer process is initiated when an imaging device receives an input imaging data stream (e.g., print job) at step 70. The sniffer process analyzes an initial sample of the input stream to determine the language format (e.g., PDL or other language) by first enumerating (step 72) through a set of language recognizers, implemented as callback functions.

In at least some embodiments, the enumeration uses a dynamic heuristic approach to selecting the order in which to try the language recognizers. For example, in one embodiment the heuristic approach involves keeping a count of the number of times the language was recognized. When a language is recognized, the count for the associated language recognizer is incremented. Initially (e.g., first power-up), the language recognizers are enumerated in a random order. After at least one successful language recognition, the language recognizers are then enumerated in a preference order according to the number of times the language was recognized (e.g., moves higher up the list as the language is more often recognized). When two or more language recognizers have the same count, the preference order within the same count group is still random. Thus, a device becomes more efficient for the specific environment in which the device is operating since there is a reduction in the average number of language recognizers applied until the language is recognized.

In another embodiment, a device maintains separate sets of heuristics that are applied according to an environmental factor. Examples of such environmental factors include a location of the device (e.g., the device moves), the locality (e.g., IP address) of the user (e.g., department) or the user itself (e.g., specific to the user's history).

With reference back to FIG. 7, each language recognizer has a sample size associated with it. For each language recognizer enumerated, the sniffer process at step 74 pre-reads or pokes the associated sample size and invokes the associated callback function with the byte sample at step 76. A determination is then made at decision block 78 as to whether or not the language recognizer recognized the language format. If it is determined at decision block 78 that the language recognizer recognized the language format, the control process terminates the enumeration process, updates the selection heuristics at step 80, initiates or loads the corresponding language interpreter at step 82, binds the byte stream to the corresponding language interpreter at step 84, and renders the job at step 86.

With reference back to decision block 78, if it is determined that the language recognizer did not recognized the language format, execution proceeds to decision block 88 for a determination as to whether or not more language recognizers exist or are available in the set. If it is determined at decision block 88 that another language recognizer exists or is available, execution returns back to step 72 for enumerating through another language recognizer, pre-reading or poking the associated sample size at step 74 and invoking the associated callback function with the byte sample at step 76.

Alternatively, if it is determined at decision block 88 that another language recognizer does not exist in the set, execution proceeds to step 90, where a user is notified. Thus, as illustrated in FIG. 7, the enumeration continues until a language recognizer acknowledges recognition of the language format or the set of language recognizers is exhausted.

Figure 8:
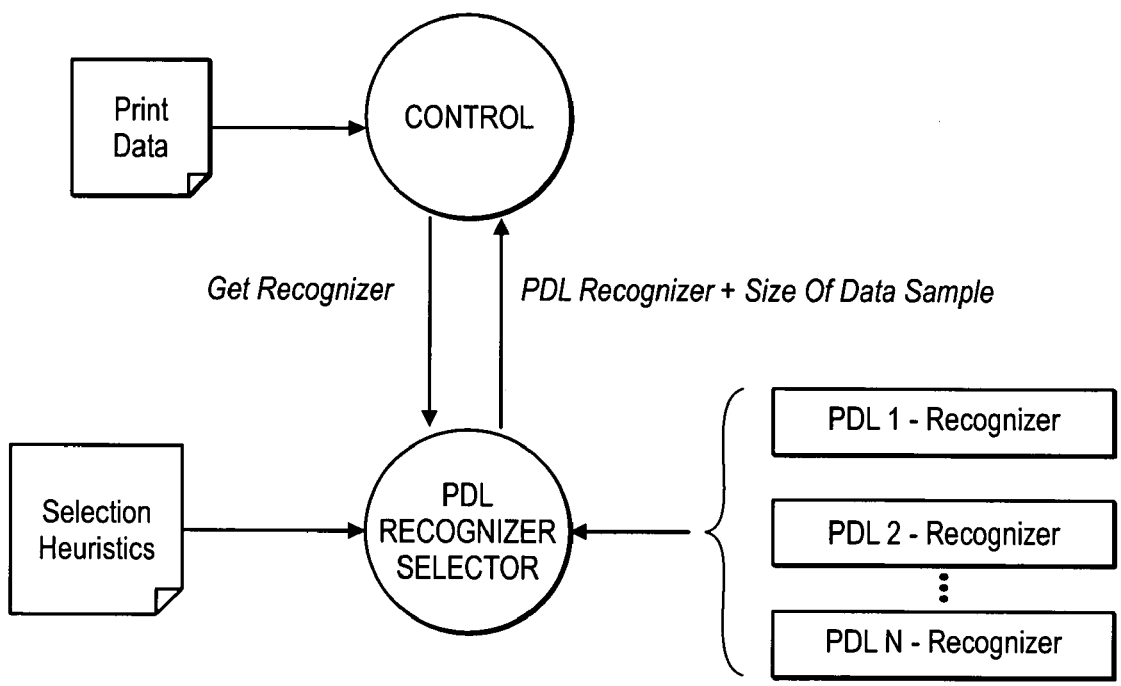
FIG. 8 illustrates a representative embodiment for providing a dynamic determination of a next language recognizer to select.

With reference now to FIG. 8, a representative embodiment for providing a dynamic determination of a next language recognizer for selection is illustrated. In FIG. 8, the sniffer comprises a control process/component, a language recognizer selector component, language recognizers and selection heuristics.

The control process is the entry point into the sniffer, initiates the other sub-processes and makes control decisions based on the results. Upon receipt of an imaging data byte stream (illustrated as "print job" in FIG. 8), the control process enumerates through the language recognizers, until the language is recognized or all the language recognizers have been exhausted. The enumeration is handled by the language recognizer selector.

The language recognizer selector uses the selection heuristics (e.g., count of past matches) to select the order to enumerate through the recognizers. Each time a language recognizer is selected, the process passes back to the control process the location (e.g., function callback address) of the recognizer and the corresponding byte size sample of the recognizer.

The control process then pre-reads or pokes the byte stream for the specified byte sample size and invokes the callback function with the byte sample as an argument. The language recognizer then returns whether the language was recognized or not (e.g., boolean return results).

If a language recognizer succeeds, the control process terminates the enumeration process, updates the selection heuristics, initiates and binds the byte stream to the corresponding language interpreter.

Figure 9:
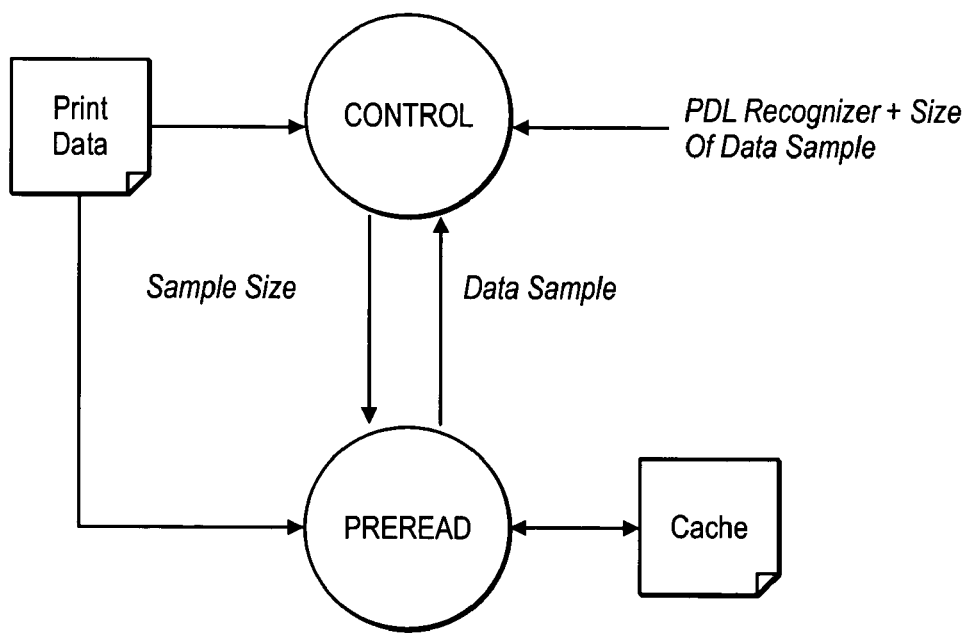
FIG. 9 illustrates a representative embodiment for dynamically determining a sample size by a currently selected language recognizer.

With reference now to FIG. 9, a representative pre-read function is illustrated for dynamically determining a sample size by a currently selected language recognizer. In FIG. 9, each time the control process enumerates a language recognizer, the control process passes the byte sample size associated with the language recognizer to a pre-read sub-process. The pre-read sub-process pokes the byte stream (e.g., does not consume the data the byte stream offset does not advance) for the byte sample size.

In the present embodiment, the sub-process uses a cache for performance improvements. The cache is used to store a byte sample. Initially the cache is empty and a copy of the first poke is stored in the cache. On subsequent pokes, if the sample size is less than or equal to the cache size, the byte sample is retrieved from the cache. Otherwise, the byte sample is pre-read from the byte stream and the cache is updated with the new (e.g., larger) byte sample.

Figure 10:
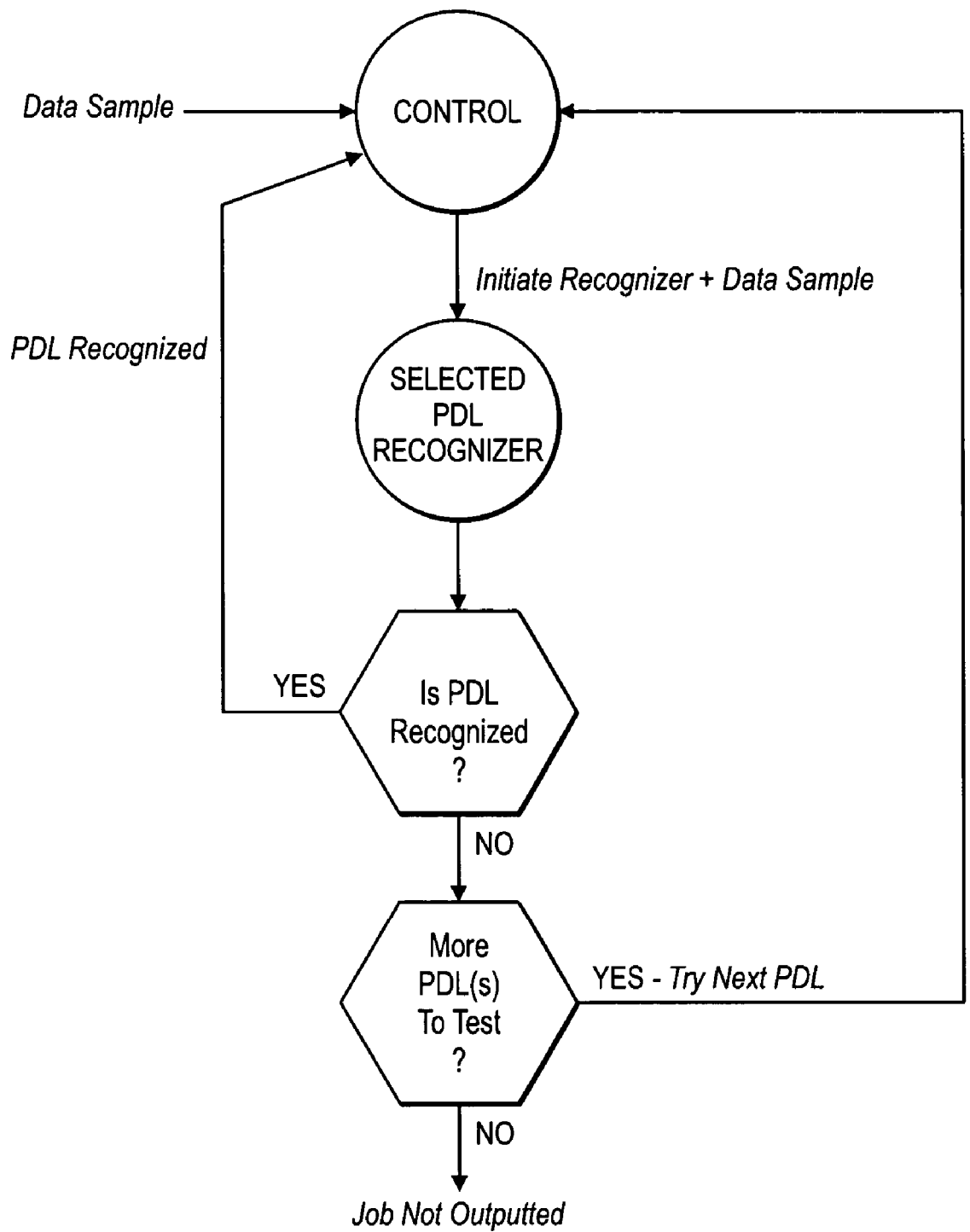
FIG. 10 illustrates a representative embodiment for sequentially testing dynamically selected language recognizers.

With reference now to FIG. 10, a representative embodiment is illustrated for sequentially testing dynamically selected language recognizers until recognized or exhausted. In FIG. 10, the control process initiates a selected language recognizer by invoking the associated callback function and passing as an argument the byte sample. If the language recognizer does not succeed, the control process determines if there are more language recognizers by calling the language recognizer selection process to enumerate the next language recognizer. If the language recognizers are exhausted without a match, then no job is output.

The language recognizer may use any method to determine the presence or absence of the language in the byte sample, such as looking for language specific special signatures (e.g., magic numbers). By way of example, the following are unique byte sequences that appear at the beginning of the following languages:

| Language | Byte Sequence |
| --- | --- |
| PJL | @PJL |
| PS | %!PS |
| PDF | %PDF |
| TIFF | II*<NUL> or MM<NUL>* |

The method used by the individual language recognizers may be different from recognizer to recognizer and is transparent to the sniffer process itself.

Figure 11:
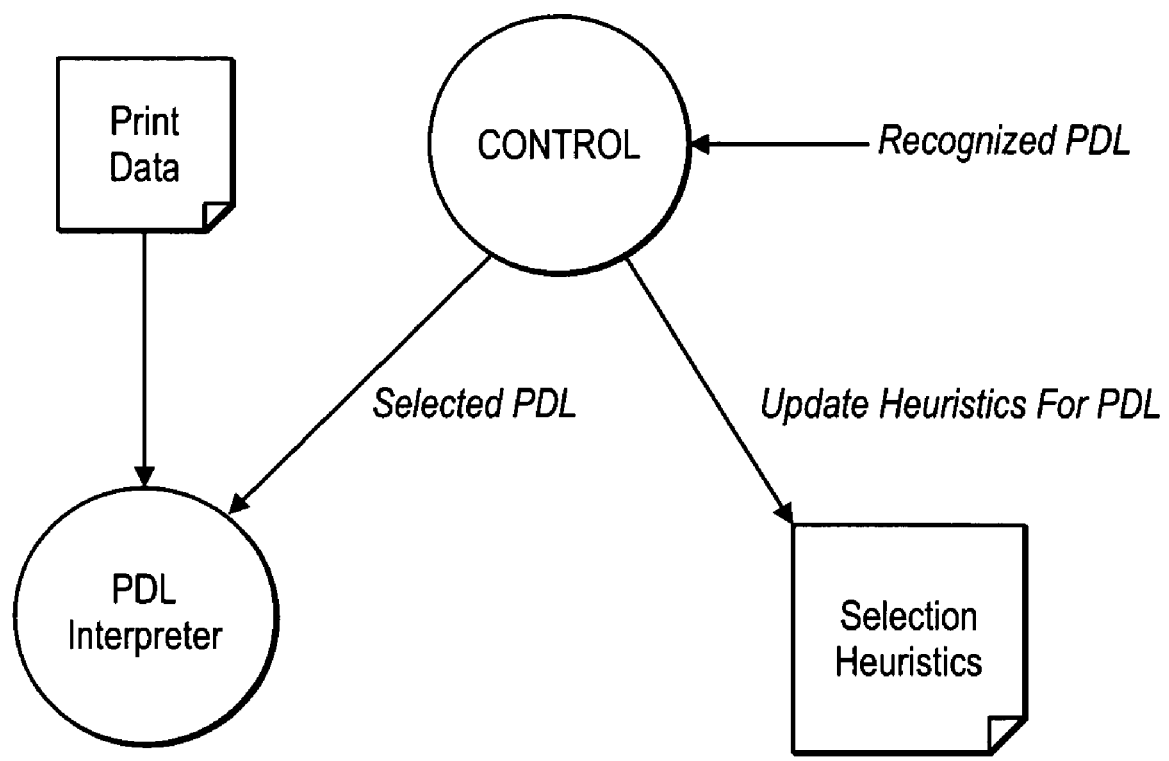
FIG. 11 illustrates a representative embodiment for initiating a language interpreter and updating heuristics after recognition.

With reference now to FIG. 11, a representative embodiment is illustrated for initiating a language interpreter and updating heuristics after recognition. In FIG. 11, the order in which the language recognizers are enumerated is dynamically determined based on a heuristic count of each language recognizer's past history for successful recognition of its corresponding language format. The process may use any method of a heuristic count, such as an increment for each successful match.

The language recognizers are then dynamically grouped according to their heuristic count, and are enumerated from highest to lowest. When multiple language recognizers are in the same group, the enumeration order within the group is randomly selected.

In some embodiments, the order to sequentially test which language is not predetermined by an upstream process. Rather, it is dynamically determined by the same process that does the matching. By way of example, the determination is either random, based on past history, or both.

When a language is recognized, the control process loads the corresponding language interpreter and binds the byte stream (i.e., print data) to the loaded language interpreter. Additionally, the control process updates the selection heuristics in a manner that increases the preference selection of the corresponding language recognizer.

While the methods and processes of the present invention have proven to be particularly useful in association with rendering print jobs having a page description language (PDL), those skilled in the art will appreciate that the methods and processes can be used in a variety of different applications and in association with a variety of different types of languages. For example, the methods and processes of the present invention embrace any imaging operation that is processed in whole or in part by an imaging device, which takes whole or part of its input in electronic format (e.g., softcopy), such as a fax, a scan, a copy, a document management process, etc, or converts a non-electronic format (e.g., hardcopy) into an electronic format as part of the input process (e.g., scan-to-OCR), and where the input or converted language format is not a rendering language but a natural language (e.g., English) or to be interpreted.

At least some embodiments of the present invention embrace medical and/or geological imaging analysis devices that take X-Ray, MRI, sonar and other inputs. Further embodiments embrace AV devices, wherein the input is an audio/visual format. Moreover, some embodiments embrace natural language devices, wherein the input includes speech and/or the written word.

Thus, as discussed herein, the embodiments of the present invention relate to image rendering. In particular, the present invention relates to systems and methods for accurately recognizing a language format of an input imaging data stream when no explicit language switch is present. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for accurately recognizing a language format of an input imaging data stream when no explicit language switch is present, the method comprising:
   using a sniffer process to analyze an initial sample of the input imaging data stream to determine the language format, wherein the sniffer process comprises:
      dynamically enumerating through one or more language recognizers, including heuristically selecting an order for enumerating through the one or more language recognizers, comprising:
         maintaining a plurality of separate sets of heuristics according to environmental factors, the separate sets of heuristics providing the order for enumerating through the one or more language recognizers, and the environmental factors being selected from the group of:
            a location of a device rendering the job represented by the input imaging data stream; and
            a locality of a user generating the input imaging data stream;
         selecting one of the sets of heuristics according to one or more environmental factors associated with the input imaging data stream; and
         using the selected set of heuristics to select an order for enumerating through the one or more language recognizers;
      pre-reading a sample size associated with a first language recognizer of the one or more language recognizers;
      invoking with the initial sample a callback function associated with the first language recognizer; and
      determining whether the first language recognizer recognizes the language format; and
   if the language format is recognized during the sniffer process, rendering a job represented by the input imaging data stream.

2. A method as recited in claim 1, wherein heuristically selecting an order for enumerating through the one or more language recognizers comprises maintaining a count for the selected set of heuristics corresponding to a number of times the language format has been recognized in association with the selected set of heuristics.

3. A method as recited in claim 1, wherein heuristically selecting an order for enumerating through the one or more language recognizers further comprises enumerating in a preference order based on a frequency of language format recognition associated with the selected set of heuristics.

4. A method as recited in claim 3, wherein the preference order is further based on a last time the language format was recognized.

5. A method as recited in claim 1, further comprising updating a set of heuristics if the language format is recognized.

6. A method as recited in claim 1, further comprising initiating and binding the imaging data stream to one of the one or more language recognizers upon recognition of the language format by said one of the one or more language recognizers.

7. A method as recited in claim 1, wherein invoking comprises using the initial sample as an argument to invoke the callback function.

8. A method as recited in claim 1, wherein if the first language recognizer does not recognize the language format, the sniffer process further comprises:
   pre-reading a sample size associated with a second language recognizer of the one or more language recognizers;

invoking with the initial sample a callback function associated with the second language recognizer; and
determining whether the second language recognizer recognizes the language format.

9. A method as recited in claim 1, wherein rendering a job represented by the input imaging data stream is performed by an imaging device, wherein the imaging device comprises one of
(i) a printer;
(ii) a multi-functional peripheral;
(iii) a scanner;
(iv) a facsimile device;
(v) an electronic whiteboard;
(vi) a display monitor;
(vii) a tablet PC;
(viii) a document server;
(ix) a copier;
(x) a medical imaging analysis device;
(xi) a geological imaging analysis device;
(xii) an audio/visual device; and
(xiii) a natural language device.

10. A method for accurately recognizing a language format of an input imaging data stream when no explicit language switch is present, the method comprising:
receiving an imaging data stream;
dynamically enumerating through one or more language recognizers, including heuristically selecting an order for enumerating through the one or more language recognizers, comprising:
maintaining a plurality of separate sets of heuristics according to an environmental factor, the environmental factor being selected from the group of:
a location of a device rendering the job represented by the input imaging data stream; and
a locality of a user generating the input imaging data stream; and
applying one of the plurality of separate sets of heuristics according to the environmental factor;
pre-reading a sample size associated with a first language recognizer of the one or more language recognizers;
invoking with the initial sample a callback function associated with the first language recognizer; and
determining whether the first language recognizer recognizes the language format, wherein once the language format is recognized, rendering a job represented by the input imaging data stream.

11. A method as recited in claim 10, wherein if the first language recognizer does not recognize the language format, the method further comprises:
pre-reading a sample size associated with a second language recognizer of the one or more language recognizers;
invoking with the initial sample a callback function associated with the second language recognizer; and
determining whether the second language recognizer recognizes the language format; wherein once the language format is recognized, rendering a job represented by the input imaging data stream.

12. A method as recited in claim 10, wherein heuristically selecting an order for enumerating through the one or more language recognizers comprises maintaining a count corresponding to a number of times the language format has been recognized.

13. A method as recited in claim 12, wherein the order is based on one of:
(i) a last time the language format was recognized; and
(ii) a number of times the language format was recognized.

14. A method as recited in claim 12, wherein heuristically selecting an order for enumerating through the one or more language recognizers comprises:
initially enumerating in a random order;
enumerating in a pre-established a preference order based on a frequency of language format recognition;
when an identical count corresponds to two or more language recognizers, enumerating the two or more language recognizers in a random order; and
updating a heuristic selection if the language format is recognized.

15. A method as recited in claim 10, further comprising initiating and binding the imaging data stream to one of the one or more language recognizers upon recognition of the language format by said one of the one or more language recognizers.

16. A computer readable medium storing a computer program product for implementing within a computer system a method for accurately recognizing a language format of an input imaging data stream when no explicit language switch is present, the computer program product comprising:
computer program code means utilized to implement the method, wherein the computer program code means is comprised of executable code for implementing:
receiving a imaging data stream;
dynamically enumerating through one or more language recognizers, including heuristically selecting an order for enumerating through the one or more language recognizers, comprising:
maintaining a plurality of separate sets of heuristics according to environmental factors, the separate sets of heuristics providing the order for enumerating through the one or more language recognizers, and the environmental factors being selected from the group of:
a location of a device rendering the job represented by the input imaging data stream; and
a locality of a user generating the input imaging data stream;
selecting one of the sets of heuristics according to one or more environmental factors associated with the input imaging data stream; and
using the selected set of heuristics to select an order for enumerating through the one or more language recognizers;
pre-reading a sample size associated with a first language recognizer of the one or more language recognizers;
invoking with the initial sample a callback function associated with the first language recognizer; and
determining whether the first language recognizer recognizes the language format, wherein once the language format is recognized, rendering a job represented by the input imaging data stream.

17. A computer readable medium storing a computer program product as recited in claim 16, wherein if the first language recognizer does not recognize the language format, the computer program code means is further comprised of executable code for implementing:
pre-reading a sample size associated with a second language recognizer of the one or more language recognizers;
invoking with the initial sample a callback function associated with the second language recognizer; and determining whether the second language recognizer recognizes the language format; wherein once the language format is recognized, rendering a job represented by the input imaging data stream.

18. A computer readable medium storing a computer program product as recited in claim 16, further comprising storing a copy of the initial sample in a cache.

19. A computer readable medium storing a computer program product as recited in claim 18, wherein if the first language recognizer does not recognize the language format, the computer program code means is further comprised of executable code for implementing:
- accessing a portion of the initial sample in the cache, the portion being a sample size associated with a second language recognizer of the one or more language recognizers;
- invoking with the portion of the initial sample a callback function associated with the second language recognizer; and
- determining whether the second language recognizer recognizes the language format; wherein once the language format is recognized, rendering a job represented by the input imaging data stream.

20. A computer readable medium storing a computer program product as recited in claim 16, wherein the order is further based on a last time the language format was recognized.

21. A computer readable medium storing a computer program product as recited in claim 18, wherein heuristically selecting an order for enumerating through the one or more language recognizers comprises updating a heuristic selection if the language format is recognized.

22. A computer readable medium storing a storing a computer program product as recited in claim 17, wherein the computer program code means is further comprised of executable code for implementing initiating and binding the imaging data stream to one of the one or more language recognizers upon recognition of the language format by said one of the one or more language recognizers.

23. A computer readable medium storing a computer program product as recited in claim 16, wherein heuristically selecting an order for enumerating through the one or more language recognizers further comprises enumerating in a preference order based on a frequency of language format recognition associated with the selected set of heuristics.

* * * * *